No. 699,880. Patented May 13, 1902.
W. LA FOLLETTE.
CHECK ROW PLANTER.
(Application filed Feb. 8, 1902.)
(No Model.) 2 Sheets—Sheet 1.

WITNESSES:
J. P. Britt
Harry Ellis Chandler

INVENTOR
W. La Follette,
BY Chandler & Chandler
Attorneys

No. 699,880. Patented May 13, 1902.
W. LA FOLLETTE.
CHECK ROW PLANTER.
(Application filed Feb. 8, 1902.)

(No Model.) 2 Sheets—Sheet 2.

WITNESSES:

INVENTOR
W. La Follette,
BY
Attorneys

UNITED STATES PATENT OFFICE.

WILLIAM LA FOLLETTE, OF BLAKESBURG, IOWA.

CHECK-ROW PLANTER.

SPECIFICATION forming part of Letters Patent No. 699,880, dated May 13, 1902.

Application filed February 8, 1902. Serial No. 93,147. (No model.)

*To all whom it may concern:*

Be it known that I, WILLIAM LA FOLLETTE, a citizen of the United States, residing at Blakesburg, in the county of Wapello, State of Iowa, have invented certain new and useful Improvements in Planters; and I do hereby declare the following to be a full, clear, and exact description of the invention, such as will enable others skilled in the art to which it appertains to make and use the same.

This invention relates to planters; and it has for its object to provide a planter which will dispense with the use of the ordinary chain and in which the dropper-operating mechanism will be so disposed as to be protected from injury by clods or other obstructions and wherein positive operation of the mechanism will be assured at all times.

A further object of the invention is to provide means for easily and quickly throwing the dropping mechanism into and out of operative relation with its driving-wheel and for reversing the direction of operation of the mechanism when the direction of progress of the machine or implement is reversed.

Other objects and advantages of the invention will be understood from the following description.

Figure 1:
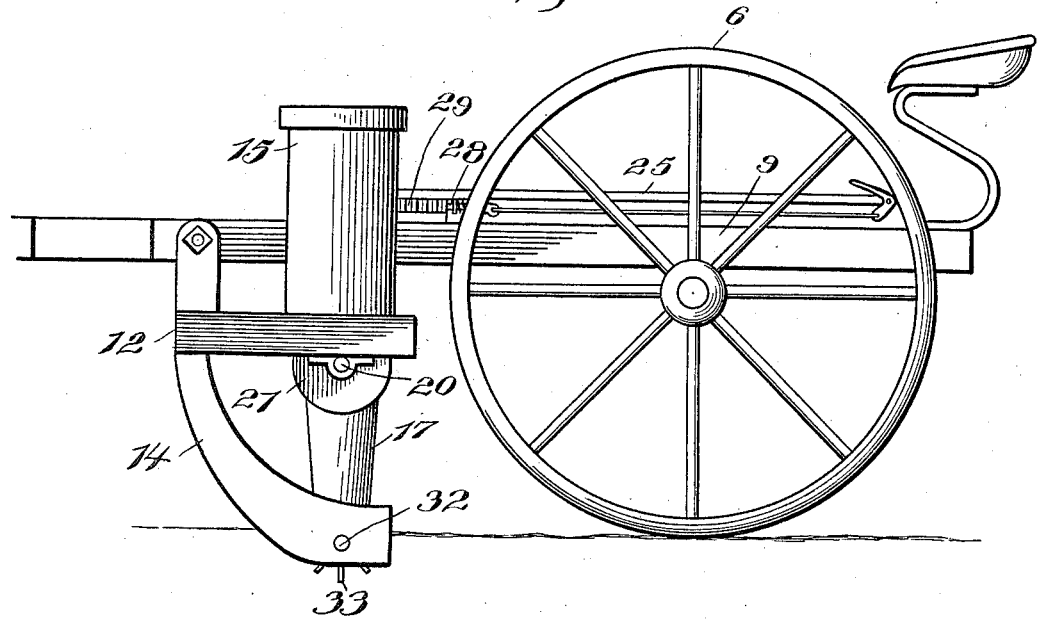
Figure 3:
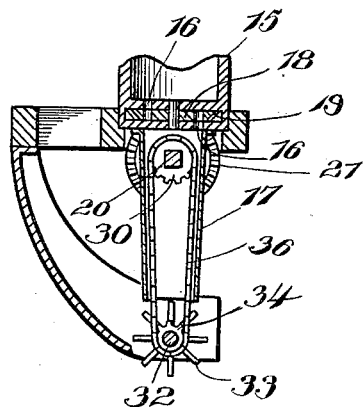
Figure 2:
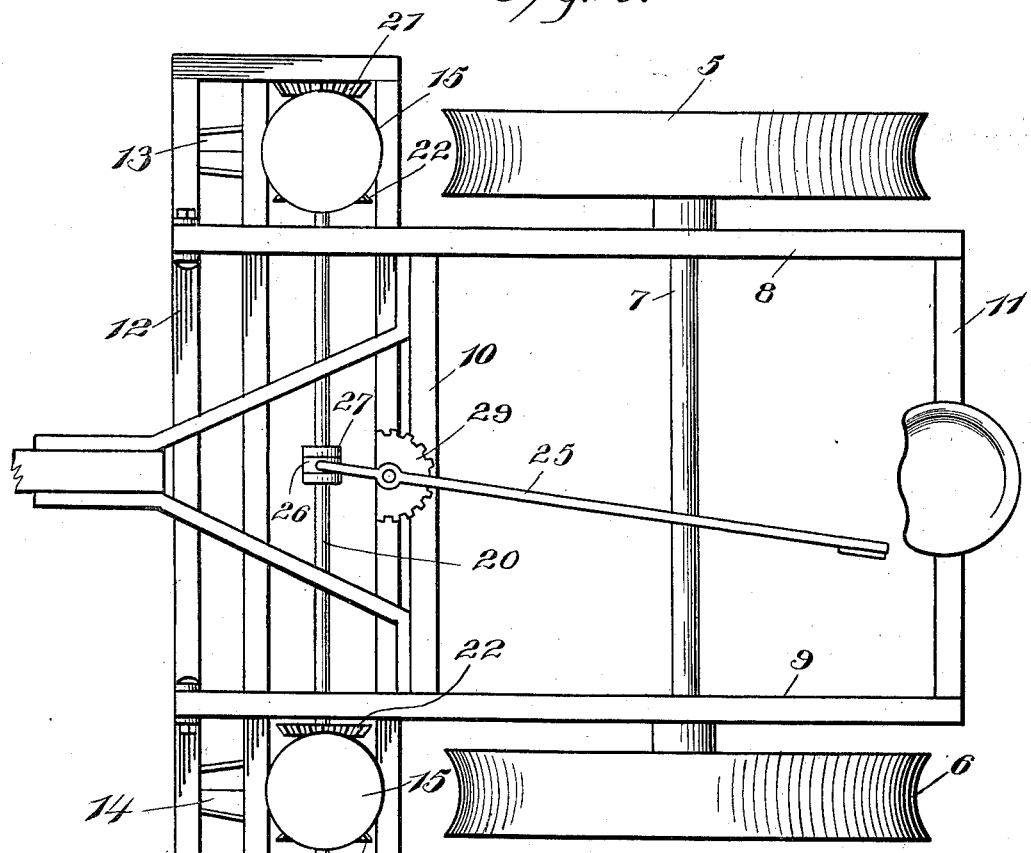
Figure 4:
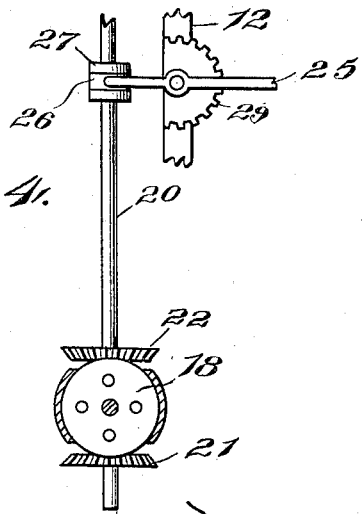

In the drawings forming a portion of this specification, and in which like numerals of reference indicate similar parts in the several views, Figure 1 is a side elevation showing a planter embodying the present invention. Fig. 2 is a top plan view of the planter. Fig. 3 is a vertical section taken longitudinally through one of the furrow-openers and showing a driving spider-wheel and its connected mechanism for operating the driving-shaft. Fig. 4 is a horizontal section showing the means for rotating the valve-disk from the driving-shaft and the means for shifting the shaft to reverse the direction of rotation of the valve-disk.

Referring now to the drawings, there is shown a planter comprising supporting-wheels 5 and 6, mounted upon an axle 7 and upon which latter is mounted the frame of the implement, comprising the side sills 8 and 9 and the front and rear cross-pieces 10 and 11, respectively. The side sills of the frame project slightly in front of the cross-piece 10, and to these projecting ends is pivotally connected the frame 12, to which in turn are connected the furrow-openers 13 and 14, which latter thus are free to move in vertical planes to compensate for unevennesses of the ground. The furrow-opening shoes 13 and 14 are hollow, and upon the frame 12, above each shoe, is mounted a seed-hopper 15. The bottom of each hopper is double, and there are openings 16 and 16' in the upper and lower members thereof, which openings are out of alinement, and in the interspace between the two members of the bottom is journaled a valve or dropping disk 18, having a suitable number of equidistant holes adapted to register successively with the openings 16. The thickness of the dropping or valve disk is such that the openings therein form pockets, each of which receives and holds a quantity of seed. The seeds pass from the hopper through an opening 16 in the bottom thereof into an opening in the disk 18, and as this disk 18 rotates said opening therein is carried around to register with the opening 16' in the lower part of the bottom of the hopper, the seed passing through this opening 16' into the boot, through which they pass and are finally discharged through the shoe into the furrow made by the shoe.

To rotate the dropping-disks of the two valve mechanisms, each of said disks is provided with a gear 19, which is shown formed integral therewith, and upon the frame 12 is journaled a rotatable and reciprocatory shaft 20, upon which are fixed at each end two pinions 21 and 22, so spaced as to permit them to stand at times at opposite sides of the adjacent gear. When the shaft is moved longitudinally in one direction, one pinion of each pair is engaged with its adjacent gear, and when the shaft is moved in the opposite direction the opposite pinion of the pair is engaged, and hence if the shaft be rotated always in the same direction the direction of motion of the dropping-disks will be reversed.

To shift the shaft 20, a lever 25 is provided and is pivoted upon the frame of the implement, said lever having a yoke 26 at one end which engages in a grooved collar 27 on the shaft, said lever being held at different points of its movement to hold either pinion of a pair engaged with its gear or to hold both pinions disengaged through the medium of a trigger or pawl 28, engaged with a notched segment 29.

To rotate the shaft 20, a sprocket-wheel 30 is disposed at each end thereof, the end portions of the shaft being squared and the sprocket-wheels having squared central openings, which receive the shaft, so that the latter may be slid through the sprockets and the latter may retain their positions in vertical planes. In each shoe is journaled a shaft 32, on which is fixed a driving-wheel in the form of a spider-wheel 33, the spokes of which project below the under side of the shoe to engage the ground and rotate the shaft as the implement progresses. On each shaft 32 is also fixed a sprocket 34 and with the sprockets 34 and 30 of each shoe is engaged a chain 36, so that the sprockets 30, and therewith the shaft 20, will be rotated. The sprocket-chains are inclosed in the boots, so that they are protected from dirt and any obstructions that may be met with, and the operation of the dropping mechanism is positive and regular.

With this construction it will be understood that the distance apart of the hills planted will depend upon the number of holes in the dropping-disk and the relative sizes of the driving-spider and sprocket-wheels and that these values may be changed as desired to secure the desired result.

In practice modifications of the construction shown may be made and any suitable materials and proportions may be used for the various parts without departing from the spirit of the invention.

In the use of the present planter the dropping-disks are rotated in one direction when the machine is progressing, and when the machine is turned to return and plant the next rows the direction of rotation of the disks is reversed, so that the rows will be sure to aline transversely of the field.

What is claimed is—

1. A planter comprising a furrow-opener, a hopper above the furrow-opener and having a boot leading to the latter, a valve mechanism for the hopper, a driving-wheel inclosed by the furrow-opener, and connections between the driving-wheel and valve mechanism for operating the latter.

2. A planter comprising a furrow-opener, a hopper above the furrow-opener and having a boot leading to the latter, a valve mechanism for the hopper, a driving-wheel inclosed by the furrow-opener, and connections between the driving-wheel and valve mechanism for operating the latter, said connections being passed through the boot.

3. A planter comprising a furrow-opener, a hopper above the furrow-opener and having a boot leading thereto, a valve mechanism for the hopper including a dropping-disk having a gear, a longitudinally-adjustable shaft having pinions fixed thereon and disposed at opposite sides of the gear for alternate engagement therewith and for simultaneous disengagement therefrom, a sprocket-wheel mounted slidably upon the shaft and splined thereto, a driving-wheel within the furrow-opener and projecting therebelow, a sprocket-wheel rotatable with the driving-wheel, and a chain connecting the wheels and passed through the boot.

4. A planter comprising a furrow-opener, a hopper above the furrow-opener having a boot leading to the latter, a driving-wheel within the furrow-opener and projecting therefrom, a dropping mechanism for the hopper and adjustable connections between the driving-wheel and dropping mechanism for reversely operating the dropping mechanism.

In testimony whereof I affix my signature in presence of two witnesses.

WILLIAM LA FOLLETTE.

Witnesses:
JERRY LA FOLLETTE,
HENRY LA FOLLETTE.